United States Patent
Qi et al.

(10) Patent No.: US 10,061,158 B2
(45) Date of Patent: Aug. 28, 2018

(54) LIGHT GUIDE PLATE WITH INTEGRATED REFLECTOR FOR DISPLAY BACKLIGHT

(71) Applicant: Apple Inc., Cupertino, CA (US)

(72) Inventors: Jun Qi, Cupertino, CA (US); Victor H. Yin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 247 days.

(21) Appl. No.: 13/664,892

(22) Filed: Oct. 31, 2012

(65) Prior Publication Data

US 2014/0118661 A1    May 1, 2014

(51) Int. Cl.
*G02F 1/1335* (2006.01)
*G02B 3/00* (2006.01)
*F21V 8/00* (2006.01)

(52) U.S. Cl.
CPC ..... *G02F 1/133605* (2013.01); *G02B 6/0031* (2013.01); *G02B 6/0025* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,394,255 A * | 2/1995 | Yokota | ............... | G02B 6/0053 349/64 |
| 5,641,219 A | 6/1997 | Mizobe | | |
| 5,764,322 A * | 6/1998 | Mamiya | ............ | G02B 6/0031 349/113 |
| 5,856,855 A | 1/1999 | Mol et al. | | |
| 5,959,775 A * | 9/1999 | Joseph | ................ | C08G 18/10 359/536 |
| 6,068,381 A | 5/2000 | Ayres | | |
| 6,685,328 B1 | 2/2004 | Hanson et al. | | |
| 7,527,418 B2 | 5/2009 | Lin et al. | | |
| 7,896,534 B2 | 3/2011 | Noh et al. | | |
| 8,033,706 B1 * | 10/2011 | Kelly | ................ | G02B 6/0036 362/307 |
| 2002/0109805 A1 * | 8/2002 | Baba | ............... | G02F 1/133615 349/65 |

(Continued)

FOREIGN PATENT DOCUMENTS

| CN | 1869738 A | 11/2006 |
|---|---|---|
| CN | 101749559 | 6/2010 |

(Continued)

*Primary Examiner* — Lauren Nguyen
(74) *Attorney, Agent, or Firm* — Treyz Law Group, P.C.

(57) ABSTRACT

An electronic device may be provided with a display. Backlight structures may be used to provide backlight for the display. The backlight structures may include a light guide plate. The light guide plate may include a planar extended portion that guides light along the back of the display and an integrated edge reflector along one or more edges of the planar extended portion. The planar extended portion and the integrated edge reflector may be formed from respective first and second shots of material. The integrated edge reflector may be formed from a polymer material with embedded reflective structures such as glass microbeads or other oxide particles. The backlight structures may include a reflective layer that is attached to the integrated edge reflector of the light guide plate using adhesive. The display may include active display pixels formed over a portion of the integrated edge reflector.

3 Claims, 7 Drawing Sheets

(56) References Cited

U.S. PATENT DOCUMENTS

| | | | |
|---|---|---|---|
| 2006/0047037 A1* | 3/2006 | Kawato | C08K 3/22 524/268 |
| 2007/0052882 A1* | 3/2007 | Hwang | G02B 6/0056 349/62 |
| 2007/0279548 A1* | 12/2007 | Cho | 349/61 |
| 2008/0024694 A1* | 1/2008 | Kondo et al. | 349/58 |
| 2009/0067196 A1 | 3/2009 | Takada et al. | |
| 2009/0091948 A1* | 4/2009 | Wang et al. | 362/613 |
| 2009/0196069 A1* | 8/2009 | Iwasaki | G02B 6/0041 362/613 |
| 2010/0110334 A1* | 5/2010 | Oki et al. | 349/62 |
| 2010/0110724 A1* | 5/2010 | Moncrieff | G02B 6/0043 362/606 |
| 2010/0321952 A1* | 12/2010 | Coleman | F21S 8/04 362/607 |
| 2010/0327952 A1* | 12/2010 | Wu | H03K 19/00369 327/513 |
| 2010/0328577 A1 | 12/2010 | Hung | |
| 2011/0007520 A1* | 1/2011 | Shigeta | G02B 6/0053 362/607 |
| 2012/0014092 A1 | 1/2012 | Lee et al. | |
| 2012/0287672 A1* | 11/2012 | Lee | 362/609 |

FOREIGN PATENT DOCUMENTS

| | | |
|---|---|---|
| CN | 101846844 | 9/2010 |
| CN | 201599666 U | 10/2010 |
| JP | 2003-131222 | 5/2003 |
| JP | 2004-031146 | 1/2004 |
| JP | 2005-108788 | 4/2005 |
| JP | 2006-171168 | 6/2006 |
| KR | 10-0427904 | 9/2004 |
| KR | 10-2009-0025811 | 3/2009 |
| TW | 200846764 | 12/2008 |
| TW | 200949378 | 12/2009 |
| TW | 201109799 | 3/2011 |

* cited by examiner

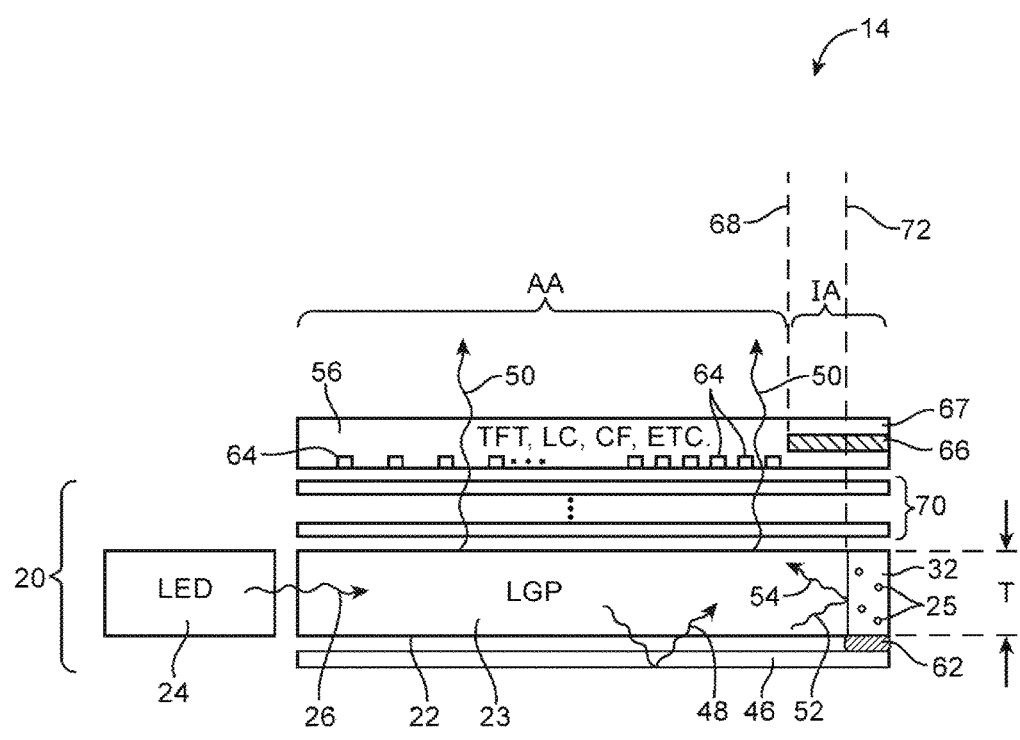
FIG. 5
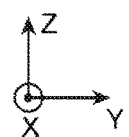

LIGHT GUIDE PLATE WITH INTEGRATED REFLECTOR FOR DISPLAY BACKLIGHT

BACKGROUND

This relates generally to electronic devices and, more particularly, to displays for electronic devices.

Electronic devices such as cellular telephones, computers, and media players often contain displays. For example, electronic devices often include backlit displays such as backlit liquid crystal displays.

Backlit displays generally include a light distribution layer called a light guide plate. The light guide plate is typically formed from a rectangular sheet of clear plastic that has been injection molded, extruded, or die cut from a sheet of plastic. Light from an array of light-emitting diodes may be launched into the edge of the light guide plate. The light guide plate distributes light across the back of a display panel by total internal reflection. Light that exits the planar upper surface of the light guide plate serves as backlight for the display panel.

In relatively large electronic devices such as televisions, the light guide plate can have a thickness that allows reflective material such as reflective tape to be attached to edges of the light guide plate that prevents light from the light guide plate from leaking into undesired areas of the device.

However, it can be challenging to add reflective structures such as tape to relatively thinner light guide plates for compact devices such as laptop computers, tablet computers, and cell phones. For example, the housing of an electronic device can be adjusted to accommodate additional reflective structures or to accommodate a larger light guide plate in which edges of the light guide plate that are prone to light leakage are embedded within additional space within the housing. However, this can lead to undesirable enlargement of the size and weight of the housing and unappealing device aesthetics.

It would therefore be desirable to be able to provide improved display backlight structures such as improved light guide plates for display backlights.

SUMMARY

An electronic device may be provided with a display. Backlight structures may be used to provide backlight for the display. The backlight structures may include a light guide plate and a reflector. The backlight structures may be used in distributing backlight to display structures in the display such as a thin-film transistor layer, a color filter layer, polarizers, and other display layers. The display may include an opaque masking layer on one or more glass layers in the display that blocks internal components in the device from view.

The light guide plate may include a first portion that distributes light across the back of the display and an integral (integrated) second portion along one or more edges of the first portion that reflects some of the light from the first portion back into the first portion. The first portion and the second portion may be formed in a two-shot molding process in which the first portion is formed from a first shot of transparent plastic and the integral second portion is formed in a second shot of reflective material.

The light guide plate may have a thickness that is, for example, less than one millimeter. The reflective second portion of the light guide plate may be formed from plastic such as polycarbonate, polymethyl methacrylate, or other plastic materials. The reflective second portion may include additives such as glass beads (microbeads) or other oxide particles that scatter light that is incident on the reflective second portion so that the light is reflected away from the reflective second portion.

The reflector of the backlight structures may be attached to the reflective second portion of the light guide plate. The opaque masking layer may be formed on a portion of a glass layer for the display in a region of the glass layer that covers at least some of the reflective second portion. The opaque masking layer may have an edge that is aligned with the interface of the first and second portions of the light guide plate or the opaque masking layer may extend over the reflective second portion and some of the first portion. The display may include active display pixels formed over the reflective second portion of the light guide plate.

Further features of the invention, its nature and various advantages will be more apparent from the accompanying drawings and the following detailed description of the preferred embodiments.

BRIEF DESCRIPTION OF THE DRAWINGS

FIG. 5 is a cross-sectional side view of an illustrative display showing how a light guide plate may include a first portion and an integral second portion that reflects light from the first portion back into the first portion in accordance with an embodiment of the present invention.

DETAILED DESCRIPTION

Electronic devices may include displays. The displays may be used to display images to a user. A display may contain backlight structures (sometimes referred to as a backlight unit) to provide backlight illumination for the display. The backlight structures may include a reflective layer (sometimes referred to as a reflector) and a light guide plate. The light guide plate may include first and second portions formed from first and second shots of material. The first portion may be a planar light distribution layer and the second portion may be an integrated edge reflector formed along an edge of the first portion. The reflective layer may be a planar reflective layer formed behind the light guide plate that is attached to the light guide plate using adhesive that is interposed between the reflective layer and the integrated edge reflector. Illustrative electronic devices that may be provided with displays having backlight structures with light guide plates with integrated edge reflectors are shown in FIGS. 1, 2, and 3.

Figure 1:
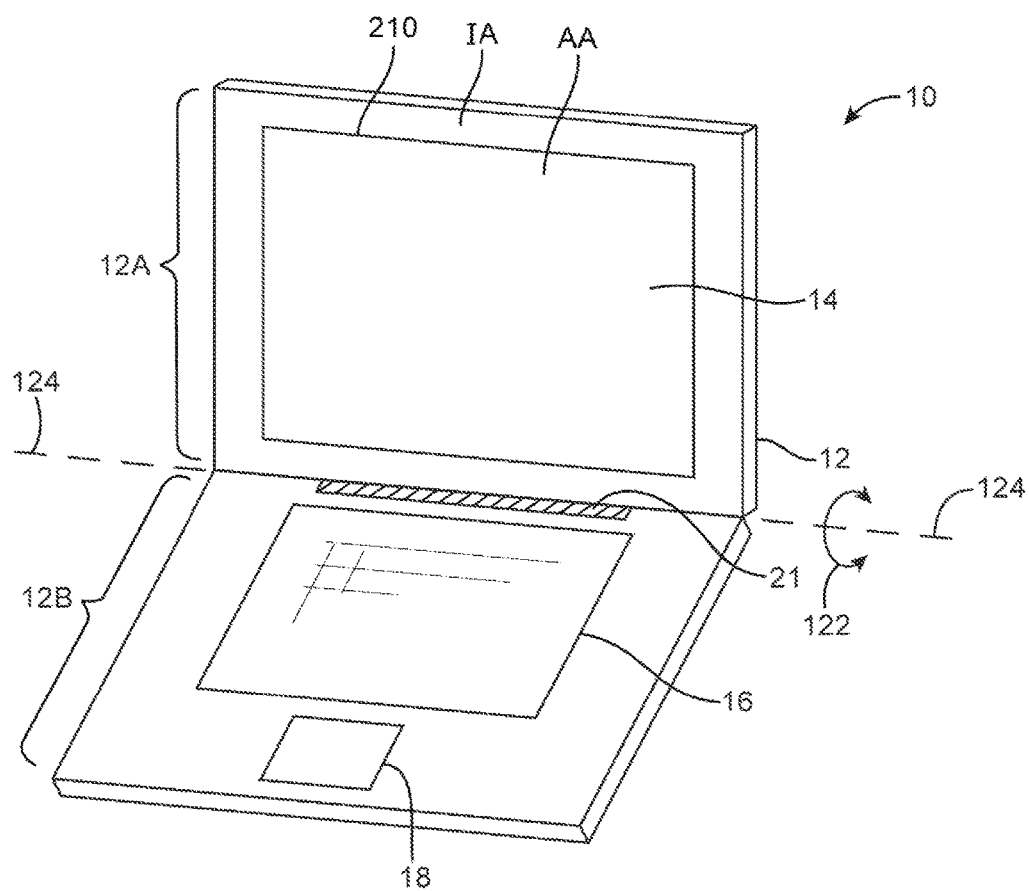
FIG. 1 is a perspective view of an illustrative electronic device with display backlight structures in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 21 that allow upper housing 12A to rotate in directions 122 about rotational axis 124 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 124.

Figure 2:
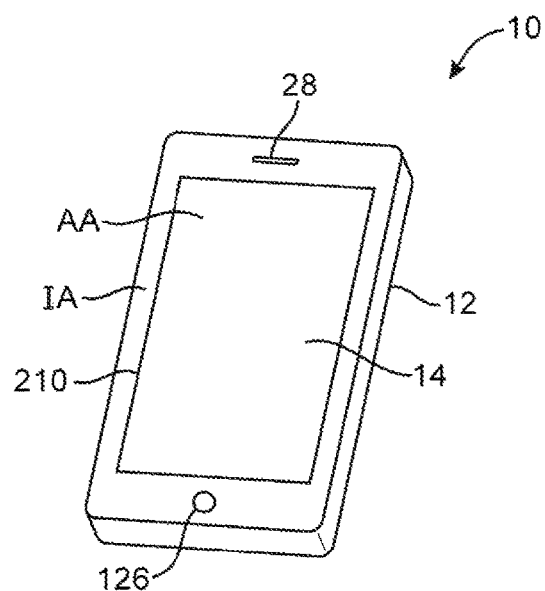
FIG. 2 is a perspective view of an illustrative electronic device such as a handheld electronic device with display backlight structures in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have a display cover layer or other exterior layer that includes openings for components such as button 126. Openings may also be formed in a display cover layer or other display layer to accommodate a speaker port (see, e.g., speaker port 28 of FIG. 2).

Figure 3:
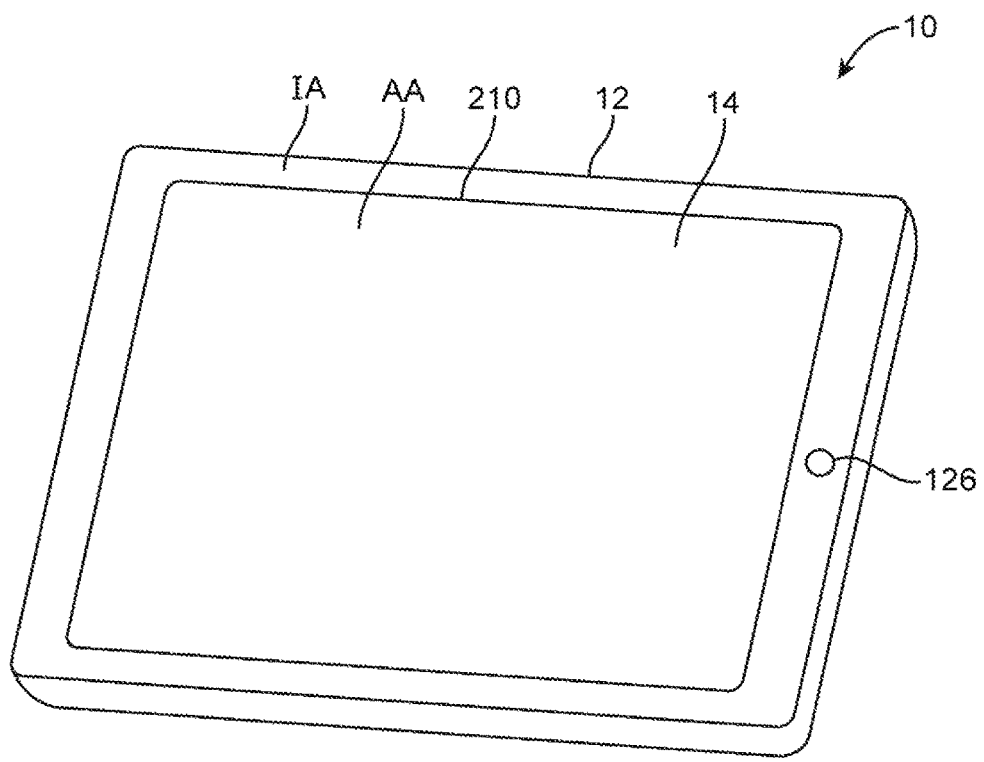
FIG. 3 is a perspective view of an illustrative electronic device such as a tablet computer with display backlight structures in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have a cover layer or other external layer with an opening to accommodate button 126 (as an example).

Peripheral portions of display 14 may be provided with an opaque masking layer. As shown in FIGS. 1, 2, and 3, display 14 may be characterized by a central active region such as active area AA in which an array of active display pixels is used in displaying information for a user. Active region AA may be surrounded by an inactive region such as inactive border region IA. Active region AA may have a rectangular shape bordered by rectangular line 210. Inactive region IA may have a rectangular ring shape that surrounds active region AA (as an example).

The underside of an outer layer of the display in inactive region IA may be covered with an opaque masking layer such as a layer of black ink (e.g., a polymer filled with carbon black). The outer layer of the display may be a transparent cover layer such as a cover layer formed from glass or transparent plastic or may be another layer of the display such as a color filter layer formed from a thin layer of glass having color filter elements formed on the glass. The opaque masking layer may help hide components in the interior of device 10 in inactive region IA from view by a user.

The illustrative configurations for device 10 that are shown in FIGS. 1, 2, and 3 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined or cast aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch-sensor or may be insensitive to touch. Touch-sensors for display 14 may be formed from an array of capacitive touch-sensor electrodes, a resistive touch array, touch-sensor structures based on acoustic touch, optical touch, or force-based touch technologies, or other suitable touch-sensor components.

Displays for device 10 may, in general, include display pixels formed from light-emitting diodes (LEDs), organic LEDs (OLEDs), plasma cells, electrowetting pixels, electrophoretic pixels, liquid crystal display (LCD) components, or other suitable display pixel structures. In some situations, it may be desirable to use LCD components to form display 14, so configurations for display 14 in which display 14 is a liquid crystal display are sometimes described herein as an example. It may also be desirable to provide displays such as display 14 with backlight structures, so configurations for display 14 that include a backlight unit may sometimes be described herein as an example. Other types of display technology may be used in device 10 if desired.

A display cover layer may cover the surface of display 14 or a display layer such as a color filter layer or other portion of a display may be used as the outermost (or nearly outermost) layer in display 14. A display cover layer or other outer display layer may be formed from a transparent glass sheet, a clear plastic layer, or other transparent member.

Touch-sensor components such as an array of capacitive touch-sensor electrodes formed from transparent materials such as indium tin oxide may be formed on the underside of a display cover layer, may be formed on a separate display layer such as a glass or polymer touch-sensor substrate, or may be integrated into other display layers (e.g., substrate layers such as a thin-film transistor layer).

Figure 4:
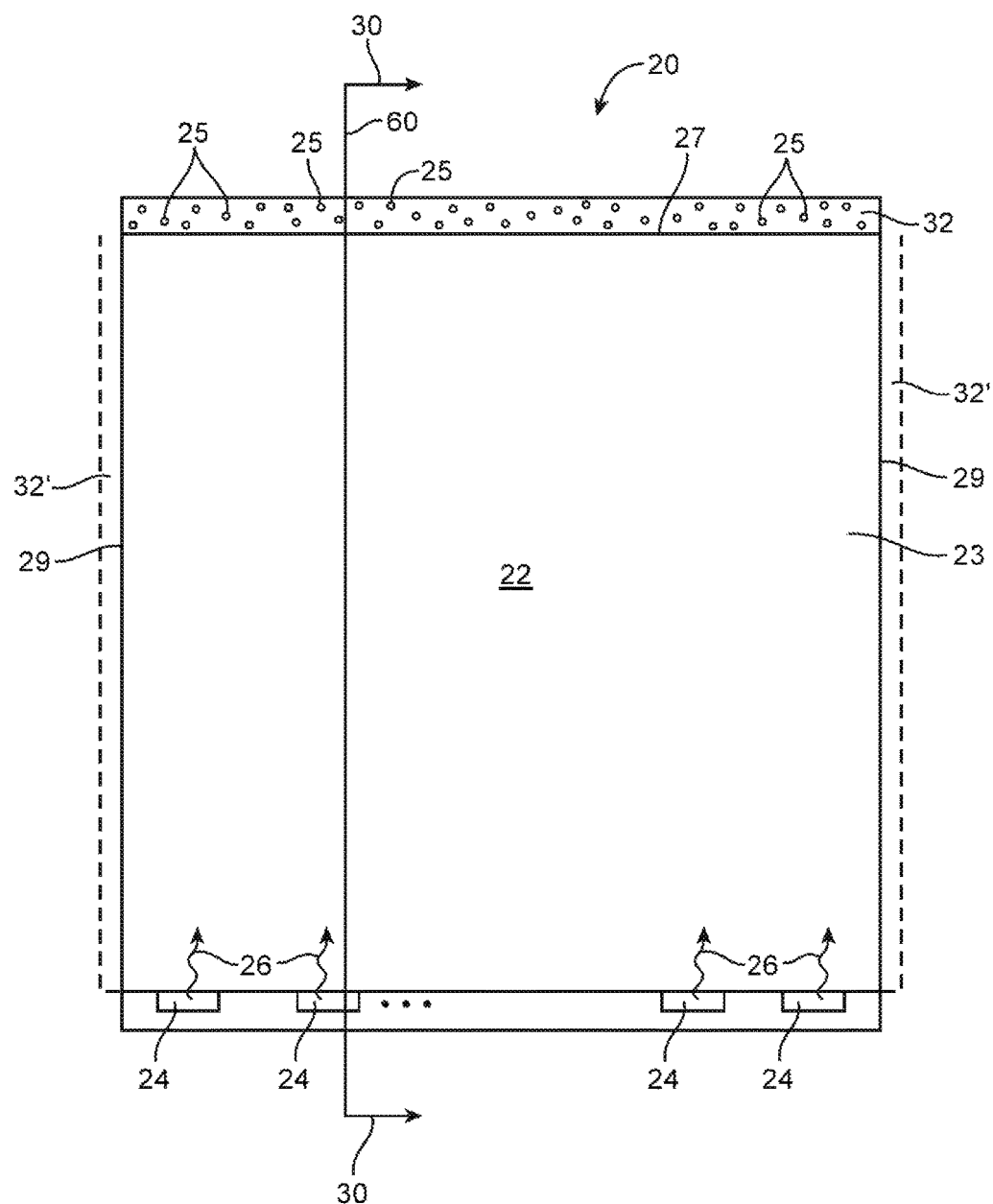
FIG. 4 is a top view of a portion of illustrative backlight structures including a light guide plate having an integral reflective edge portion in accordance with an embodiment of the present invention.

Backlight for display 14 may be provided using backlight structures of the type shown in FIG. 4. As shown in FIG. 4, backlight structures 20 may include a light guiding structure such as light guide plate 22. Although display 14 may, in general, have any suitable shape, configurations for device 10 in which display 14 has a rectangular shape are sometimes described herein as an example. Light guide plate 22 may be used in providing backlight for display 14 and may have a shape that matches the shape of display 14.

As shown in FIG. 4, backlight 26 may be launched into one or more of the edges of light guide plate 22 (e.g., one or more of the four edges of a rectangular light guide plate) from light sources such as light-emitting diodes 24. In the example of FIG. 4, light-emitting diodes 24 are launching light 26 into the bottom edge of light guide plate 22. Other configurations may be used if desired (e.g., configurations in which light is launched into multiple edges of the light guide plate, etc.).

Light guide plate 22 may include a first portion 23 and a second portion 32. Portion 32 may be an insert-molded integral portion of light guide plate 22 (e.g., portion 23 and portion 32 may form a single continuous light guide plate structure formed form two shots of material).

Portion 23 of light guide plate 22 may be a planar light guiding portion of light guide plate 22 formed from a transparent material such as glass or a polymer such as acrylic or other clear plastic (as an example). Light 26 is guided within portion 23 of light guide plate 22 due to the principle of total internal reflection. Some of light 26 is extracted from light guide plate 22 via engineered features on the upper surface of the light guide plate, the lower surface of the light guide plate, or both the upper and lower light guide plate surfaces.

Downwardly directed light is reflected back into the light guide plate towards a viewer by a reflector layer under the light guide plate. Upwardly directed light travels through the active layers of display 14 that are formed above the backlight. For example, in a liquid crystal display, the upwardly directed light travels through a thin-film transistor layer, a color filter layer, and a layer of liquid crystal material that is interposed between the color filter layer and thin-film transistor layer. The color filter layer may be used to provide display pixels with different colors. The thin-film transistor layer may be used to control the transmission of individual display pixels of the liquid crystal material. Backlight may pass through upper and lower polarizers that are formed above and below the color filter layer and thin-film transistor layer, respectively.

Portion 32 of light guide plate 22 may be formed from a reflective material such as a polymer that is infused with light scattering or light reflecting particles such as particles 25. Light scattering particles 25 may be formed from glass microbeads or other oxide particles that scatter light that is incident on portion 32 from portion 23 of light guide plate 22. Light scattering particles 25 may be embedded in a polymer material such as polycarbonate (PC), polymethyl methacrylate (PMMA), or other plastic materials that are injection molded to form portion 32. In this way, portion 32 may be formed as an integrated (integral) edge reflector for light guide plate 22. Light 26 that travels through portion 23 of light guide plate 22 may be reflected off of integrated edge reflector 32 and back into portion 23.

As shown in FIG. 4, light guide plate 22 may be provided with an integrated edge reflector 32 that is formed along top edge 27 of portion 23 of light guide plate 22 (i.e., an edge of portion 23 that is opposite to the edge of portion 23 into which light-emitting diodes 24 emit light into light guide plate 22). However, this is merely illustrative. If desired, additional integrated edge reflectors 32' may be formed along sidewall edges 29 of portion 23. In general, light guide plate 22 may be provided with integrated edge reflectors along some or all of one edge, two edges, three edges or four or more edges of light guide plate 22. Integrated edge reflectors such as portions 32 and/or 32' may conform to a straight edge of portion 23 (as in the example of FIG. 4) or may conform to edges of portion 23 having other shapes (e.g., curved shapes).

Light guide plate 22 may be mounted in a display backlight chassis such as a chassis formed from plastic, metal, glass, ceramic, wood, carbon-fiber composites and other composites, other materials, and combinations of these materials. In some illustrative examples, one or more of the materials includes plastic. Plastic (polymer) materials for the chassis may be relatively stiff materials such as polycarbonate (PC), acrylonitrile butadiene styrene (ABS), or a PC/ABS blend or may be relatively soft polymers such as synthetic rubber, natural rubber, silicone, or other elastomeric materials. Rigid and elastomeric polymers are collectively referred to herein as "plastic."

In some illustrative examples, light guide plate 22 may be formed in a chassis having opaque structures and/or reflective structures formed along the sidewall edges 29 of light guide plate 22 so that the chassis prevents light from leaking from sidewall edges of light guide plate 22 while integrated edge reflector 32 prevents light from leaking from the top edge of light guide plate 22. Integrated edge reflector 32 may help reduce light leakage within (or from) display 14 without increasing the size of light guide plate 22.

During operation of backlight structures 20, light 26 is launched into the interior of portion 23 of light guide plate 22 from light-emitting diodes 24. When light 26 reaches one of the edges of portion 23 such as top edge 27 in FIG. 4, light 26 may be incident on integrated edge reflector 32. Due to the presence of integrated edge reflector 32, light is reflected back into portion 23. The reflected light may therefore be extracted by features on an upper surface of light guide plate 22 in portion 23 to serve as backlight for display 14. Because light is reflected back into portion 23, backlight is not wasted and overall backlight efficiency is enhanced.

A cross-sectional side view of backlight structures 20 of FIG. 4 (and additional display structures) taken along line 60 and viewed in direction 30 is shown in FIG. 5. As shown in FIG. 5, backlight structures 20 may include a reflective layer such as reflector 46 formed along an inner surface of light guide plate 22 and may include diffuser films and other optical films such as optical films 70 formed along an opposing outer surface of light guide plate 22.

Optical films 70 may include diffuser layers for helping to homogenize backlight 50 and thereby reduce hotspots, compensation films for enhancing off-axis viewing, and brightness enhancement films (also sometimes referred to as turning films) for collimating backlight 50. Optical films 70 may overlap the other structures in backlight unit 20 such as light guide plate 22 and reflector 46. For example, if light guide plate 22 has a rectangular footprint in the X-Y plane of FIG. 5, optical films 70 and reflector 46 may have a substantially similar rectangular footprint.

As shown in FIG. 5, light 26 may be emitted in direction Y and may be launched into the edge of portion 23 of light guide plate 22 (e.g., the left-hand edge of plate 22 in the orientation of FIG. 5). Some of light 26 may be extracted in the downward direction towards the interior of device 10 and may reflect back in the upwards (Z) direction off of reflector 46, as indicated by light ray 48. Reflector 46 may be formed from a layer of white plastic, white paper, metal foil, or other suitable reflective surface. As indicated by light rays 50, some of light 26 and reflected light from reflector 46 such as light that has been extracted from light guide plate 22 in the upward direction passes vertically through display structures 56.

Display structures 56 may include display module structures such as polarizers, a thin-film transistor glass layer, a color filter glass layer, a liquid crystal layer, and other display layers. Display structures 56 may, if desired, include an outer cover layer formed from glass or clear plastic (as examples). Surface features may be incorporated into light guide plate 22 in portion 23 to enhance light extraction efficiency (e.g., to enhance extraction at particular locations on the light guide plate).

Some of light 26 will be guided to the edges of portion 23 of light guide plate 22 due to the principle of total internal reflection. This light, which is shown as light ray 52 in the diagram of FIG. 5, reflects off of integrated edge reflector 32 and returns into portion 23, as indicated by light ray 54.

Light guide plate 22 may have a thickness T. Thickness T may be between 0.5 mm and 0.7 mm, between 0.3 mm and 0.9 mm, less than 1 mm, less than 3 mm, less than 5 mm, or between 0.1 and 0.5 mm (as examples). Because of the relatively small thickness of light guide plate 22, it may be difficult to add reflective structures such as reflective tape to an edge such as edge 27 of light guide plate 22. For example, additional space within a housing such as housing 12 (FIG. 1) of device 10 may be used to accommodate the additional reflective structures. As another example, the edge of light guide plate 22 may lack sufficient surface area for adhesive of an additional light reflecting structure. Because portion 32 is an integral portion of light guide plate 22, backlight structures 20 may be provided in device 10 without adding additional space within the housing for device 10 for additional reflective structure such as reflective tape. The presence of integrated light reflector 32 may therefore help to minimize the size of backlight structures 20 and device 10.

Backlight structures 20 may include adhesive such as adhesive 62 that attaches reflector 46 to light guide plate 22. Adhesive 62 may be a pressure sensitive adhesive (PSA), a light curable adhesive, or other suitable adhesive. Adhesive 62 may be formed between integrated reflective portion 32 of light guide plate 22 and reflector 46. Because adhesive 62 is attached to integrated edge reflector 32, light 26 may be prevented from reaching adhesive 62. In this way, reflector 46 may be attached to light guide plate 22 without attaching any materials to portion 23 of light guide plate 22 that reduce the total internal reflection of light 26, thereby increasing the efficiency of backlight structures 20 and reducing the risk of light leakage from light guide plate 22.

As shown in FIG. 5, display structures 56 may include active display pixels 64 in active area AA that are used in controlling the emission of backlight 50 from display 14. Active display pixels 64 may include portions of liquid crystal (LC) material in display structures 56 that are controlled by electrodes on a thin-film transistor (TFT) layer of display structures 56. Each active display pixel 64 may include a color filter element on a color filter (CF) layer of display structures 56. In this way, pixels 64 may be used to display color images to a user of device 10.

Display structures 56 may include an opaque masking layer such as masking layer 66 in inactive area IA of display 14. Opaque masking layer 66 may, for example, be a layer of black ink or reflective metal formed on a glass layer (e.g., a thin-film transistor glass layer, a color filter glass layer, or a cover glass layer) of display structures 56. Opaque masking layer 66 may prevent a user of device 10 from viewing internal components of device 10.

Figure 6:
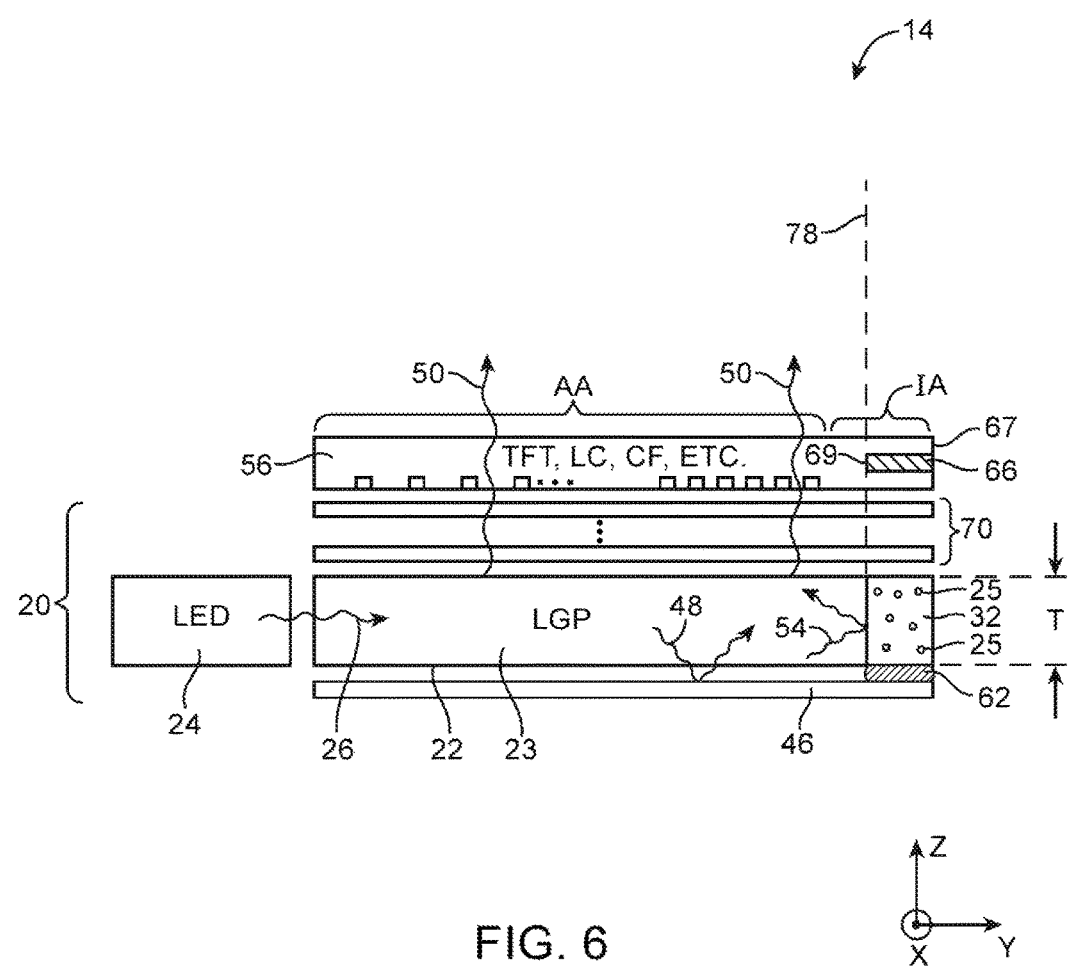
FIG. 6 is a cross-sectional side view of an illustrative display of the type shown in FIG. 5 showing how an inactive area of the display may have an edge that is aligned with the interface between the first and second portions of the light guide plate in accordance with an embodiment of the present invention.
Figure 7:
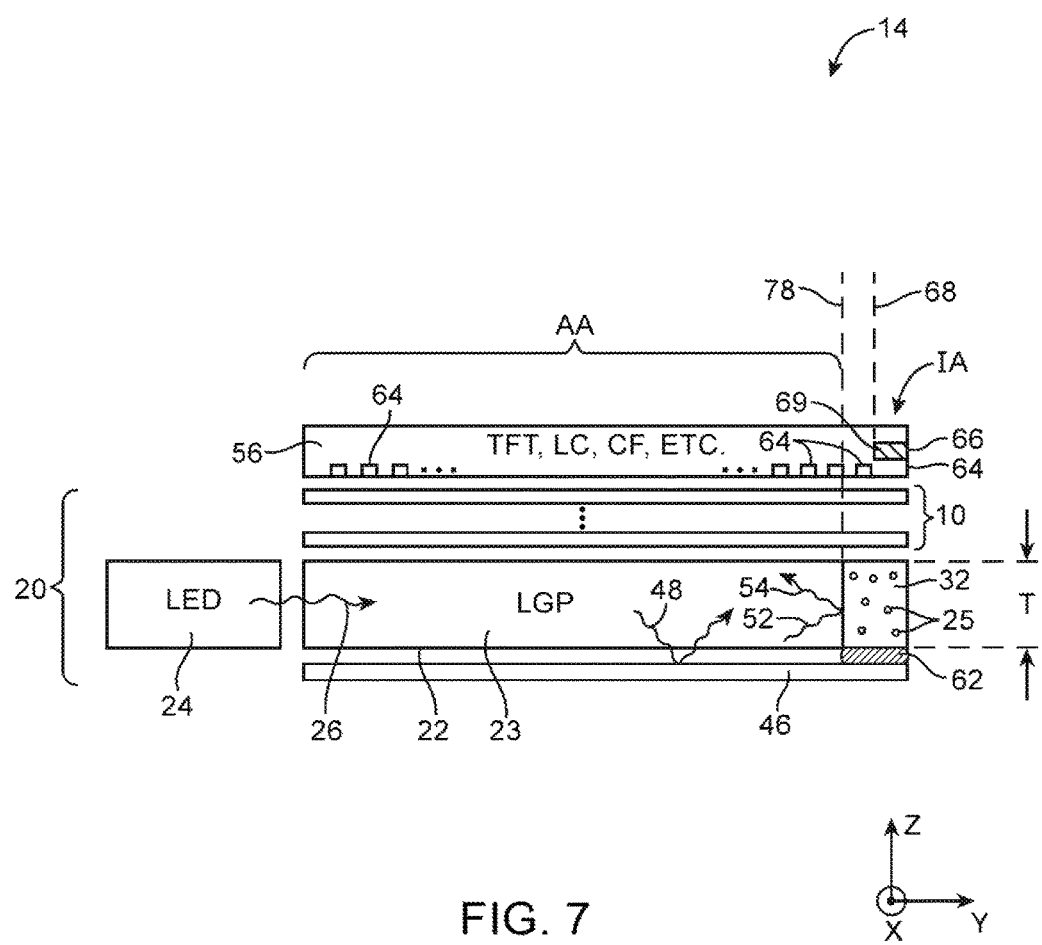
FIG. 7 is a cross-sectional side view of an illustrative display of the type shown in FIG. 5 showing how a portion of an active area of the display may be formed over the integral second portion of the light guide plate in accordance with an embodiment of the present invention.

As shown in FIG. 5, opaque masking layer 66 may extend from an edge such as edge 67 of display structures 56 to a position (as indicated by dashed line 68) that is beyond the interface between portion 23 and portion 32 of light guide plate 22 (as indicated by dashed line 72). In this type of configuration, inactive area IA of display 14 may include substantially all of integrated edge reflector 32 and at least some of portion 23 of light guide plate 22. However, this is merely illustrative. As shown in FIGS. 6 and 7, opaque masking layer 66 may be formed using other configurations with respect to integrated reflector 32.

The presence of integrated edge reflector 32 having particles 25 along edge 27 of portion 23 of light guide plate 22 may prevent a sharp edge at which the intensity of backlight 26 changes (i.e., in comparison with sharp intensity changes at edges of light guide plates without integrated reflectors). Because the human eye is particularly sensitive to sharp changes, the more gradual edge of light guide plate 22 formed from integral reflector 32 with particles 25 may allow active area AA to be extended nearer to edge 67 of display structures 56 without generating undesirable intensity changes that are noticeable to a user, thereby reducing the size of inactive area IA.

FIG. 6 is a cross-sectional side view of backlight structures 20 of FIG. 4 (and additional display structures) taken along line 60 and viewed in direction 30, showing how an inner edge such as edge 69 of opaque masking layer 66 may be aligned with the interface of portions 23 and 32 of light guide plate 22 (as indicated by dashed line 78). In the configuration of FIG. 6, active display pixels 64 may be formed up to the line defined by the interface of portions 23 and 32 of light guide plate 22 (e.g., line 78). In this type of configuration, inactive area IA may include substantially all of portion 32 of light guide plate 22 without covering any of portion 23 of light guide plate 22.

FIG. 7 is a is a cross-sectional side view of backlight structures 20 of FIG. 4 (and additional display structures) taken along line 60 and viewed in direction 30 showing how inner edge 69 of opaque masking layer 66 may be formed over portion 32 of light guide plate 22 at a location (as indicated by dashed line 68) that does not reach the interface of portions 23 and 32 (as indicated by dashed line 78). In the configuration of FIG. 7, active display pixels 64 may be formed over integrated edge reflector 32 of light guide plate 22 (i.e., active display pixels 64 may be formed closer to edge 67 of display structures 56 than a line (e.g., line 78) defined by the interface of portions 23 and 32 of light guide plate 22. In this type of configuration, inactive area IA may include less than all of portion 32 without covering any of portion 23 of light guide plate 22.

Figure 8:
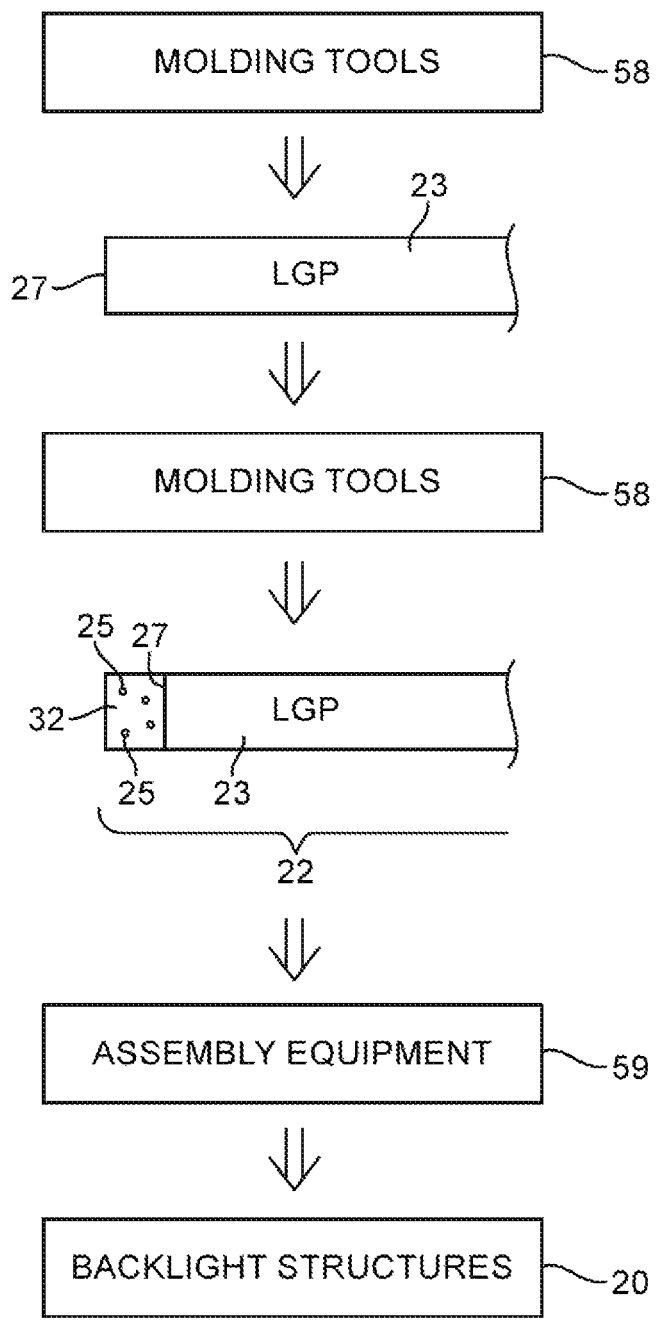
FIG. 8 is a diagram showing how injection molding techniques may be used in forming a light guide plate having a first portion and an integral reflective second portion in accordance with an embodiment of the present invention.

FIG. 8 is a diagram showing how backlight structures 20 for device 10 may be formed. As shown in FIG. 8, portion 23 of light guide plate 22 may be formed using molding equipment such as a molding tools 58 (e.g., plastic injection molding equipment). For example, portion 23 of light guide plate 22 may be formed from a shot of plastic injected into a mold structure. If desired, molding tools 58 may also include one or more die cutting tools (e.g., to cut portion 23 of light guide plate 22 from a larger sheet of light guide material).

Molding tools 58 may then be used to mold a structure such as integrated edge reflector 32 (e.g., plastic or other polymer material with particles 25) onto the exterior edge of portion 23 of light guide plate 22. In this way, integrated edge reflector 32 may be injection molded into a mold that contains a previously formed light guiding portion (e.g., portion 23) of a light guide plate.

Following formation of integrated edge reflector 32 onto edge 27 of portion 23 of light guide plate 22, assembly equipment 59 (e.g., robotic equipment or manual tools) may be used to assemble light guide plate 22 and additional backlight members (e.g., optical films, a reflector, adhesive, and a plastic and/or metal chassis) to form backlight structures 20.

Assembly equipment 59 may include die cutting tools, machining tools such as grinding and milling tools, laser cutting tools, welding tools, mechanical assembly tools such as tools for press fitting parts together, tools for exposing work pieces to light and/or heat, tools for applying coatings such as physical vapor deposition tools for depositing layers of dielectric and metal (e.g., to form a thin-film stack or metal coating), electrochemical deposition tools, photolithography tools, tools for patterning conductive materials such as metallic paint and other liquids (e.g., painting tools, pad printing tools, screen printing tool, ink jet tools, dipping tools, spraying tools, etc.), tools for injection molding plastic, tools for soldering, ovens and other tools for applying heat, equipment for bending structures, and other suitable manufacturing and assembly tools.

The foregoing is merely illustrative of the principles of this invention and various modifications can be made by those skilled in the art without departing from the scope and spirit of the invention.

What is claimed is:

1. A display, comprising:
   backlight structures that include a light guide plate having first and second pairs of opposing parallel peripheral edge surfaces that define a rectangular perimeter of the light guide plate, a light source that emits light into a first peripheral edge surface in the first pair, an integrated edge reflector attached directly to a second peripheral edge surface in the first pair, and optical films, wherein the first and second peripheral edge surfaces are interposed between the light source and the integrated edge reflector, wherein the first and second peripheral edge surfaces are perpendicular to the opposing parallel peripheral edge surfaces in the second pair, and wherein the light guide plate further comprises upper and lower surfaces that each extend from the first peripheral edge surface to the second peripheral edge surface and between the opposing parallel peripheral edge surfaces in the second pair; and
   display structures formed over the backlight structures that receive backlight that exits the light guide plate through the upper surface, wherein the display structures comprise active display pixels in an active area of the display and an opaque masking layer in an inactive area of the display, wherein the opaque masking layer at least partially overlaps the integrated edge reflector of the light guide plate, wherein at least one of the active display pixels is located over a portion of the integrated edge reflector of the light guide plate, and wherein an axis perpendicular to the upper surface of the light guide plate passes through the upper surface, the lower surface, the optical films, and the active area of the display without passing through any of the first and second pairs of opposing parallel peripheral edge surfaces.

2. The display defined in claim 1 wherein the backlight structures further comprise a reflective structure attached to the integrated edge reflector of the light guide plate.

3. The display defined in claim 1 wherein the at least one of the active display pixels overlaps the portion of the integrated edge reflector of the light guide plate.

* * * * *